W. BUDDËUS.
PROCESS OF ROASTING FINE ORES.
APPLICATION FILED JAN. 20, 1911.
1,079,897.
Patented Nov. 25, 1913.
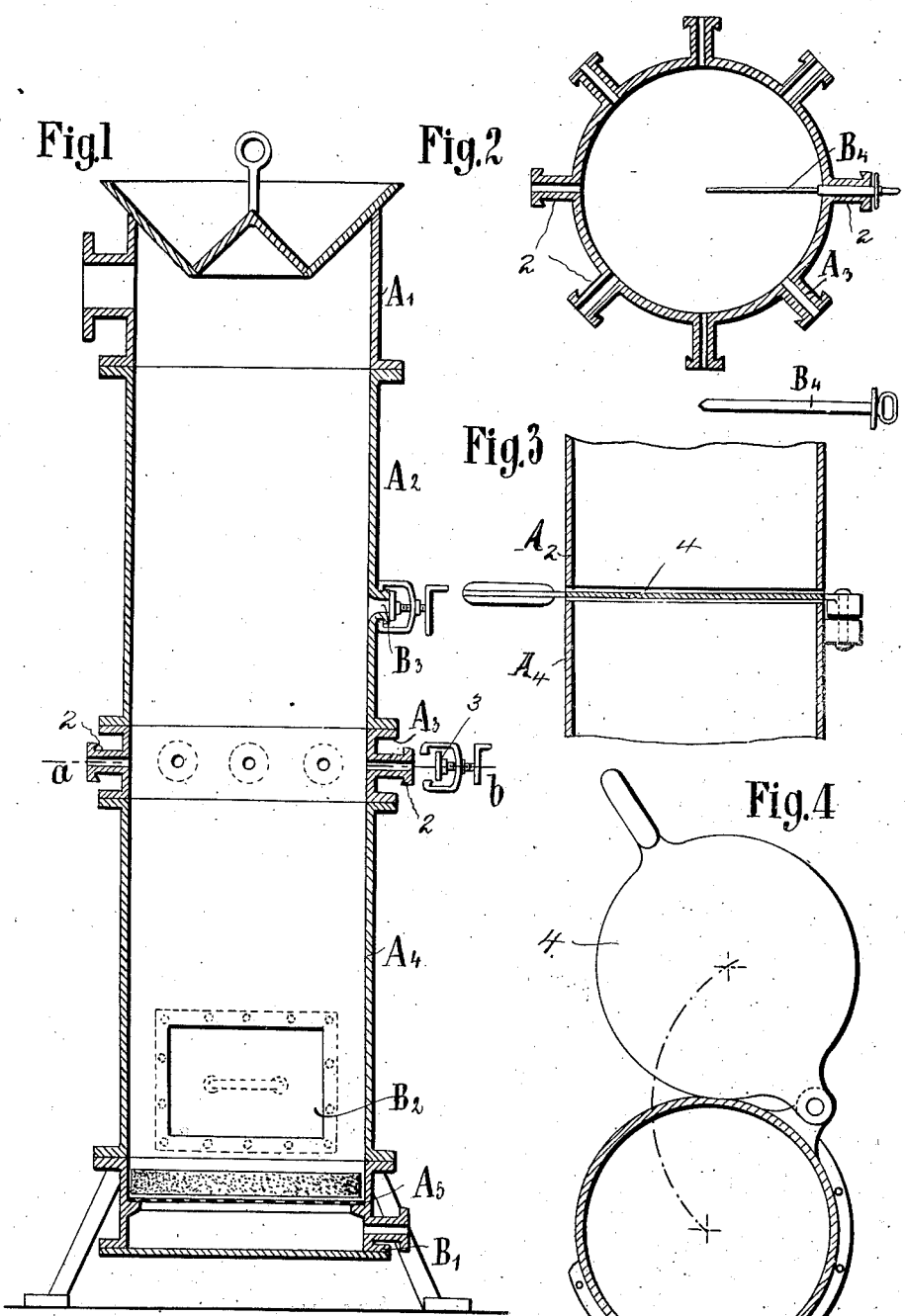

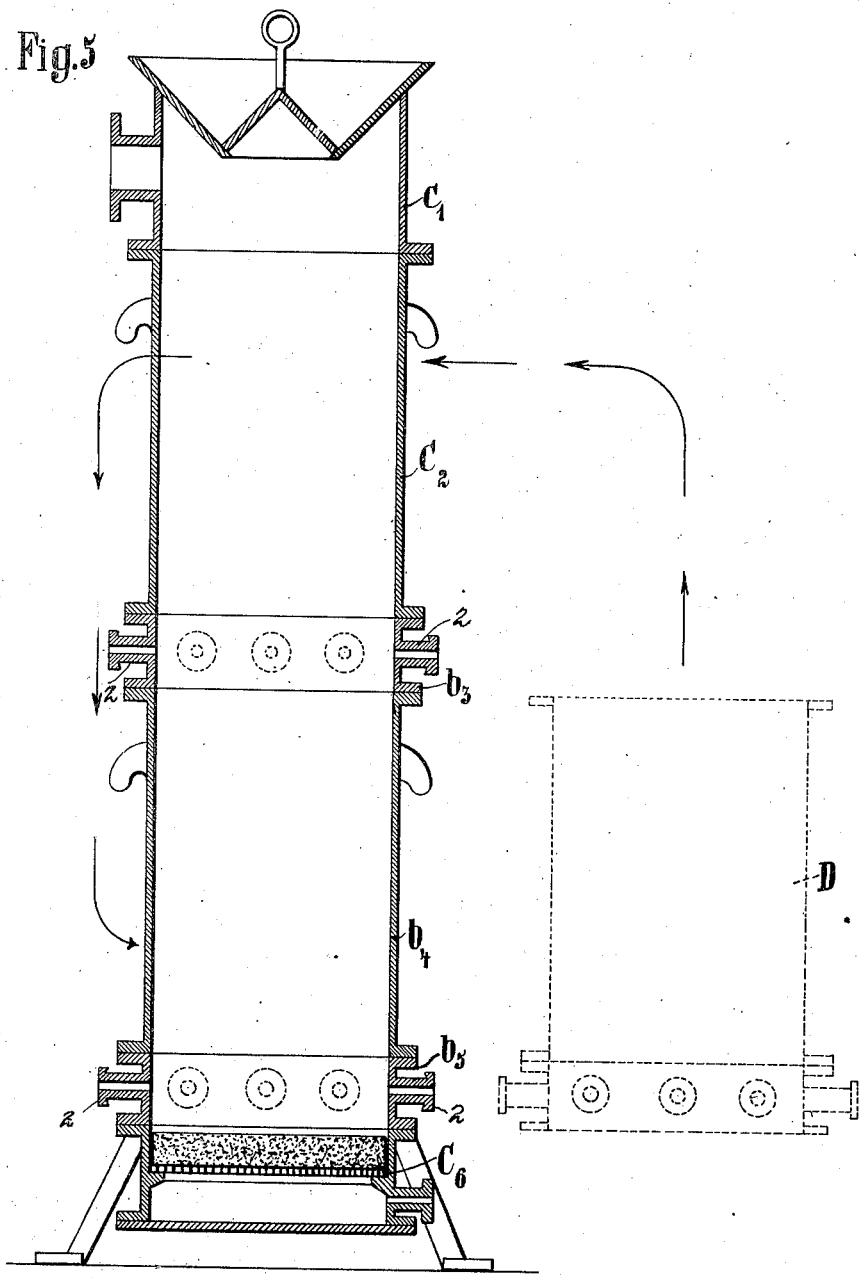

UNITED STATES PATENT OFFICE.

WILHELM BUDDËUS, OF WIESBADEN, GERMANY, ASSIGNOR TO JOHN DERN, OF SALT LAKE CITY, UTAH.

PROCESS OF ROASTING FINE ORES.

1,079,897. Specification of Letters Patent. Patented Nov. 25, 1913.

Application filed January 20, 1911. Serial No. 603,745.

*To all whom it may concern:*

Be it known that I, WILHELM BUDDËUS, a subject of the Duke of Saxe-Coburg-Gotha, residing at 13 Wielandstrasse, Wiesbaden, Germany, have invented a certain new and useful Improved Process of Roasting Fine Ores; and I do hereby declare the following to be a full, clear, and exact description of the invention.

The roasting of for example, fine ores poor in sulfur, in the furnaces hitherto employed, of the reverberatory, muffle, step and mechanical types, etc., has been possible only with the aid of an external heat supply, because a certain minimum percentage of sulfur is necessary to enable the ore to continue to burn independently. This minimum percentage is for example 20 to 25 per cent. in the case of pyrites. Even zinc blendes containing 30 per cent. of sulfur cannot be roasted completely without a considerable consumption of fuel. The roasting of such ores for the purpose of converting them into oxid compounds with the recovery of sulfuric acid, or with the object of sulfating the valuable metals contained in the ores, has therefore been possible practically only in muffle furnaces with a considerable supply of external heat and consumption of mechanical work. This applies to the roasting of copper ores, galena, zinc blende and to the chlorinating roasting of ores containing copper, zinc and silver, and of the residues of roasted pyrites.

The advantage of the improved roasting furnace hereinafter described over the known furnaces of this kind consists primarily in enabling such ores to be roasted without any external supply of heat. This advantage is produced by employing a roasting furnace of the shaft type having a porous bottom, through which the roasting air is driven.

In all types of furnaces employed hitherto for roasting fine ores poor in sulfur, the air acts only upon a comparatively thin layer of the ore where it produces oxidation, and then escapes at once with the gases in a hot state and thus carries almost the whole of the heat away with it. In the improved furnace the hot gases coming from the roasting zone are caused by their flow on the counter current principle to come in contact with and thus give up their heat to the unroasted ore, which thereby undergoes a preliminary roasting process, while the gases themselves are cooled to such a degree that they can be readily condensed.

The use of a porous bottom through which the roasting air is blown, is an essential feature of the present invention, because only a porous bottom can insure the supply of air for combustion in a state of such fine subdivision as to render the formation of passages or flues in the column of ore impossible. Such passages would allow a considerable portion of the admitted air to escape without exerting its oxidizing action upon the metal sulfids contained in the charge, so that instead of producing an increase of temperature, heat would be withdrawn from the furnace. In using a porous bottom such as has been already proposed in connection with a reverberatory furnace, in a roasting furnace of the shaft type, no passages are formed, and consequently the oxygen of the admitted air for combustion is completely utilized and the roasting proceeds uniformly upward throughout the entire cross section of the column of ore. With a proper admission of air for combustion the escaping gases contain only traces of oxygen. Since these escaping gases can be readily condensed, there are no difficulties such as are met with in condensing the hot exhaust gases of muffle furnaces. There are further no difficulties with regard to draft, and the costly chimney is unnecessary. There is practically no production of flue dust with its attendant loss of metal.

It has been found in practical working that the consumption of salt in chlorinating roasting is lower than with the muffle furnace, because there are no losses of hydrochloric acid in the shaft furnace, so that the whole of this acid is utilized for chlorinating.

In the case of burnt residues containing copper, there is more water-soluble copper in the roasted product than in the product of muffle furnace roasting. About 160 kilogs. of burnt residues are roasted every 24 hours per square meter of muffle surface in a muffle furnace, whereas in the shaft furnace, the output is 2000 kilogs. and over, that is about twelve times as much, thus diminishing the required space in an equal proportion.

The hot preliminarily roasted ore which has been situated last in the upper part of the shaft furnace may be used for igniting fresh ore in another furnace. By arranging a number of such furnaces in a ring, the working can be carried on continuously and solely by means of the heat produced by the sulfur contained in the ore. The furnaces may however be worked singly in a continuous manner. For this purpose they are provided with a special apparatus, by means of which the roasted layer of ore can be separated from the preliminarily roasted or the as yet unroasted layer, and the completely roasted ore can be easily withdrawn.

The ore to be roasted is charged cold into the furnace and is withdrawn when roasted, cold from the furnace. The ore passes on the counter-current principle through a roasting zone which is maintained permanently in the furnace; it enters this zone in the unroasted state, and it leaves it in the roasted state. The hot roasted ore is completely cooled by the air flowing through it. In this manner the working may be rendered continuous, and it has been found in practice that an excellent uniform roasting of burnt residues containing only 3 per cent. of sulfur in the form of sulfid can be effected without coal according to this invention.

Two constructions of furnace according to this invention are illustrated by way of example in the accompanying drawings, in which:—

Figure 1 is a central vertical section of one construction of the improved furnace. Fig. 2 is a horizontal cross section on the line $a-b$ of Fig. 1, Fig. 3 shows a detail, Fig. 4 is a plan to Fig. 3. Fig. 5 is a central vertical section of the other construction of the improved furnace.

The improved shaft furnace (Fig. 1) is composed substantially of two cylindrical parts $A_2$ and $A_4$ surmounted by a charging funnel $A_1$ and a gas outlet. An intermediate part $A_3$ is arranged between the parts $A_2$ and $A_4$. Under the part $A_4$ is the air box and the porous bottom $A_5$.

In starting the furnace, for instance, a layer of ore that has been heated elsewhere to the temperature of oxidation of sulfur, is placed on the porous bottom and the furnace is filled with cold ore. Then compressed air is blown through the porous bottom, through which it passes in a state of fine subdivision into the ore. The sulfur of the hot layer of ore burns very energetically and ignites the overlying cold ore so that the roasting zone shifts gradually upward. When the roasting zone has risen beyond the intermediate part $A_3$ and the lower part of the furnace has cooled, sword-like bars $B_1$ are inserted through tubular necks 2 or slots which are otherwise closed airtight by suitable closures 3. These necks or slots are arranged star-fashion in the case of round or oval furnaces (Fig. 2), and parallel to the furnace wall in the case of rectangular furnaces.

Instead of the bars in the case of furnaces formed with a slot, a sharp disk 4 (Figs. 3 and 4) is driven parallel to the hearth of the furnace into the column of ore according as the ores cake together slightly or not in roasting.

When the sword-like bars are parallel to one another and are capable of turning on their longitudinal axes, they may remain in the furnace during the roasting operation, during which they are placed on edge so that the upper and lower columns of ore are in connection with each other through the spaces between the bars.

For the purpose of separating the two columns of ore from each other, the bars are turned flat, in which position they lie close to one another without any space between. Instead of these bars, a permanent or a removable grate may be employed having for instance holes diminishing in size toward the bottom. By means of this device the roasted portion of the column of ore is cut off from the unroasted portion, and the roasted portion is then drawn from the furnace through the door $B_2$. After closing the door $B_2$ the bars or the disk are withdrawn, to allow the preliminarily roasted ore to fall on to the hearth of the furnace. Then the upper, now vacant part of the furnace is charged anew with raw ore which becomes ignited by the preliminarily roasted ore and so on. Thus the ore travels always in the opposite direction to the flow of the air.

The furnace is provided at suitable places with stoking holes $B_3$, through which the preliminarily roasted ore can be pushed down from the outside.

Instead of emptying the furnace through the door $B_2$, it may be emptied by lowering or turning down the air box, in which case the contents are discharged automatically by gravity.

If it is desired to prevent in any case the hot ore in the furnace from falling down, the furnace is provided as shown in Fig. 5, with two devices for separating the column of ore. In this construction the furnace is worked as follows: After inserting the separating device, the entire upper part $C_1 C_2$ of the furnace is raised a few centimeters by means of a crane. Then after inserting a similar separating device into the part $b_6$, the lower part $b_4 b_5$ of the furnace is moved to one side on a railway into the position indicated in dotted lines at D and is there emptied, while the upper part $C_2$ and $b_3$ is placed upon the air box $C_6$. The emptied part $b_4$ and $b_5$ of the furnace is then placed by means of the crane upon the part $C_2$ and $b_3$, and filled with fresh ore. Then on withdrawing the separating device and starting the air blast anew, the furnace is again in working order. The movements of the parts of the furnace always take place in the same direction indicated by the arrows. The shifting of the parts of the furnace may however be effected in any other manner, for instance by raising the two parts of the furnace by means of a pulley or hoist; or the parts of one furnace may be interchanged with the parts of another furnace in the case of an installation of more than one furnace.

The same constructions of grate may be used in a movable furnace of this kind as in a stationary furnace.

The movable furnace as well as the stationary may have a conical shape tapering either toward or from the places of separation, according to the nature of the ores to be treated, for the purpose of either facilitating or hindering the slipping down of the ore. The current of air instead of having an upward may have a downward direction, that is to say, the air may either be drawn up through the porous bottom or be supplied from above under pressure. The furnace may have any desired cross section, and the separating devices may be arranged at any suitable places in the furnace. In large furnaces the insertion of the separating device may be effected by mechanical power.

The improved process is suitable for roasting and heating all kinds of fine ores. Ores which contain no combustible constituents may have these added to them in the form of, for instance, carbon and sulfurous fuels.

I claim:

1. The process of treating metal bearing ores adapted to be roasted by internal combustion of the mass, which comprises igniting the combustible ingredients of the ore at the bottom of a columnar charge of the ore, supplying combustion supporting gas in finely divided jets at the bottom of the charge and passing said gas through the charge substantially uniformly, thereby progressing the zone of combustion upwardly through the charge and removing from time to time the treated ore from below the zone of combustion as said zone ascends.

2. The process of treating metal bearing ores adapted to be roasted by internal combustion of the mass, which comprises igniting the combustible ingredients of a columnar charge of ore at the bottom of said charge, supplying combustion supporting gas to the bottom of said charge thereby progressing the zone of combustion upwardly through the charge and maintaining the height of the charge above the zone of combustion sufficient to utilize practically all of the heat generated by the combustion and practically all of the oxygen in the combustion supporting gas and removing from time to time the treated ore from below the zone of combustion as said zone ascends.

3. The process of treating ore, which comprises igniting the bottom of a columnar charge of ore containing combustible, supplying air to the charge at the bottom thereof thereby upwardly progressing the zone of combustion, stopping the supply of air, removing that portion of the charge below the combustion zone after said zone has risen the desired height, bodily lowering the remaining portion of the charge and increasing the height of said remaining portion by adding new material on top of said remaining portion.

4. The process of treating ore, which comprises igniting the bottom of a columnar charge of ore containing combustible, supplying air through a porous material to the bottom of the charge, thereby upwardly progressing the combustion zone, temporarily discontinuing the supply of air while supporting the charge beneath the zone of combustion after said zone has risen a desired height, removing that portion of the charge below the point of support, bodily lowering the remaining portion of the charge and then supplying fresh material to the top thereof and at the proper time continuing the supply of air.

5. The process of treating metal bearing ores adapted to be roasted by internal combustion of the mass, which comprises igniting the combustible ingredients of the ore at the bottom of a columnar charge of the ore, supplying combustion supporting gas in finely divided jets at the bottom of the charge and passing said gas through the charge substantially uniformly, thereby progressing the zone of combustion upwardly through the charge and removing the treated ore from below the zone of combustion as said zone ascends.

In testimony that I claim the foregoing as my invention I have signed my name in presence of two subscribing witnesses.

WILHELM BUDDËUS.

Witnesses:
HERMAN PLISCHKE,
MARIA MENKE.